J. R. MOFFATT.
TRIMMING MECHANISM FOR SEWING MACHINES.
APPLICATION FILED MAR. 26, 1914.
1,292,008.
Patented Jan. 21, 1919.
5 SHEETS—SHEET 3.
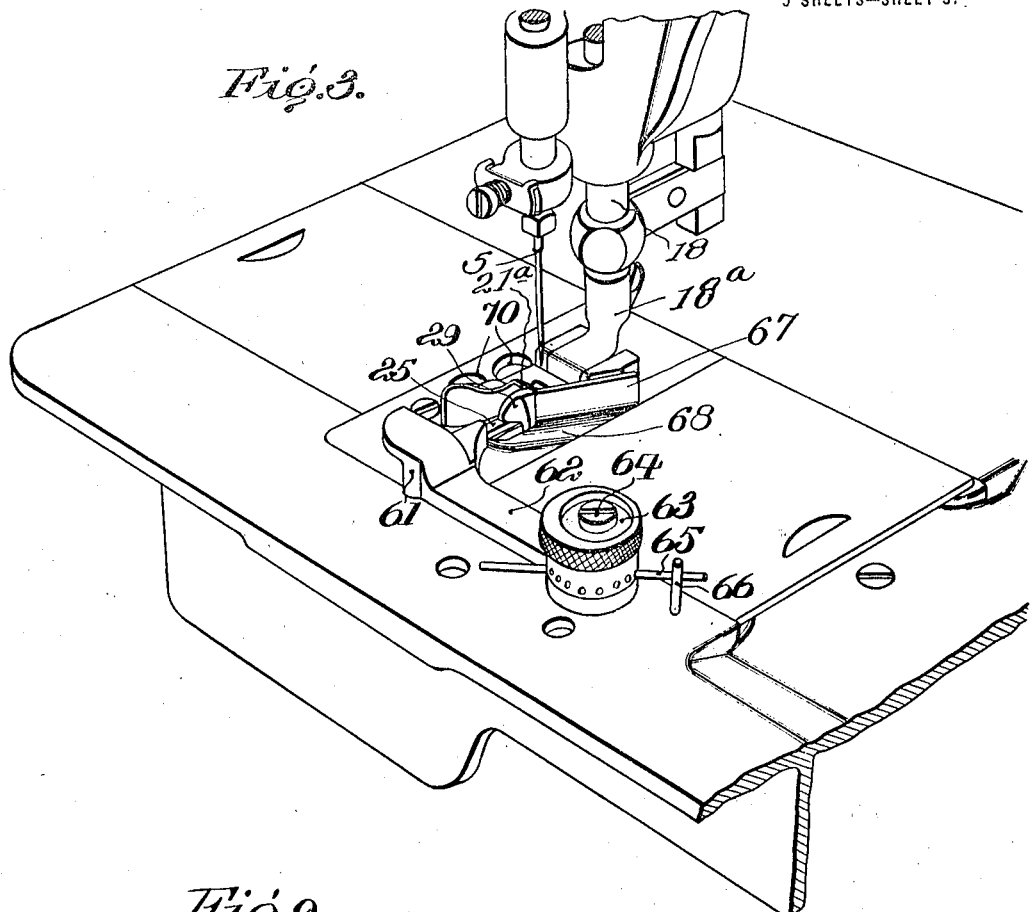
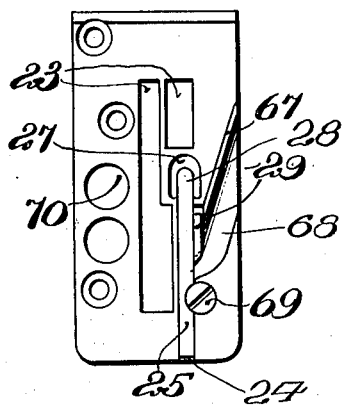
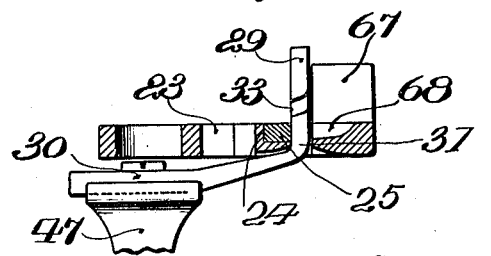
Witnesses
Inventor
James R. Moffatt
By Sturtevant Mason
Attorney J. R. MOFFATT.
TRIMMING MECHANISM FOR SEWING MACHINES.
APPLICATION FILED MAR. 26, 1914.
1,292,008.
Patented Jan. 21, 1919.
5 SHEETS—SHEET 4.
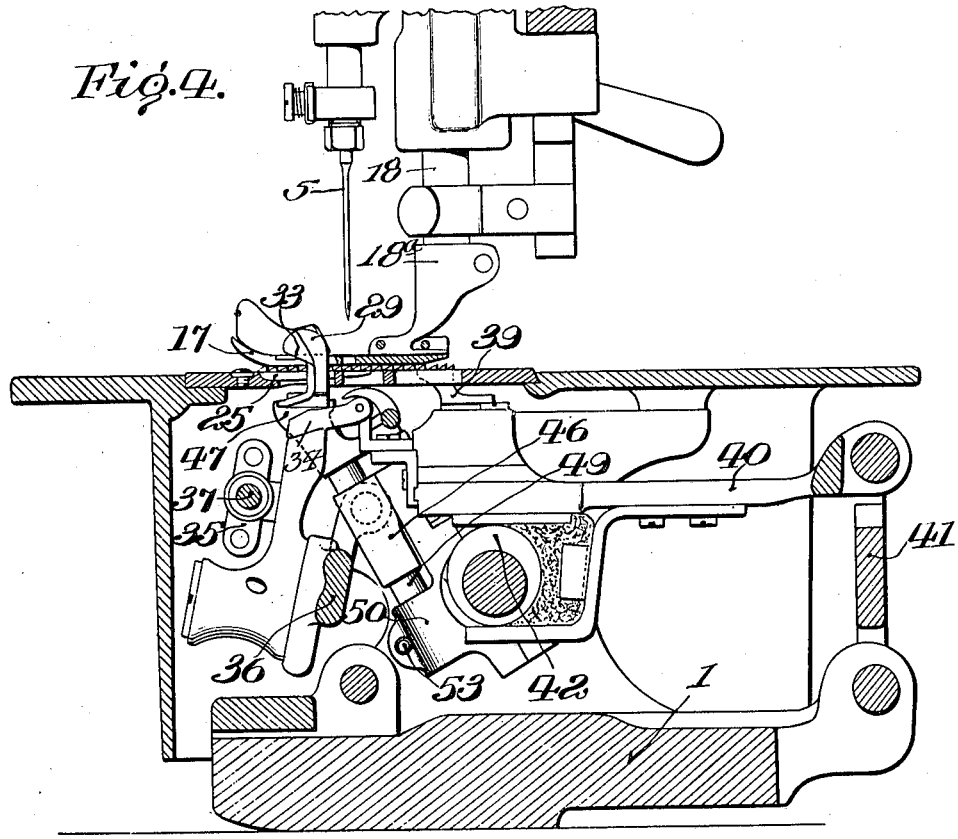
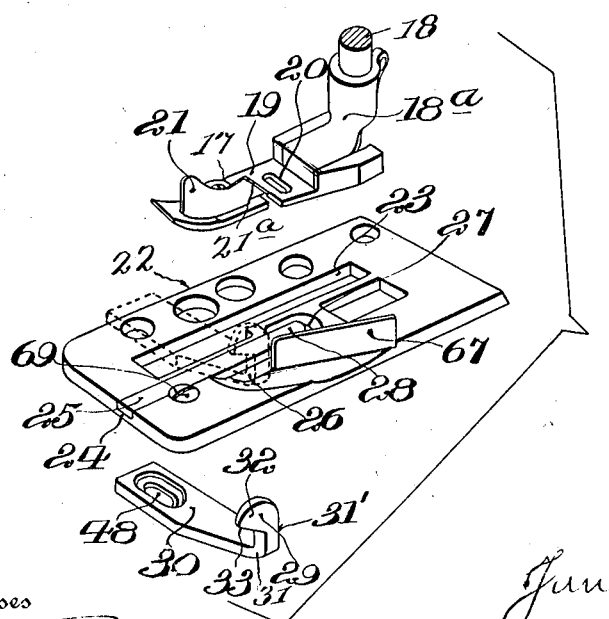

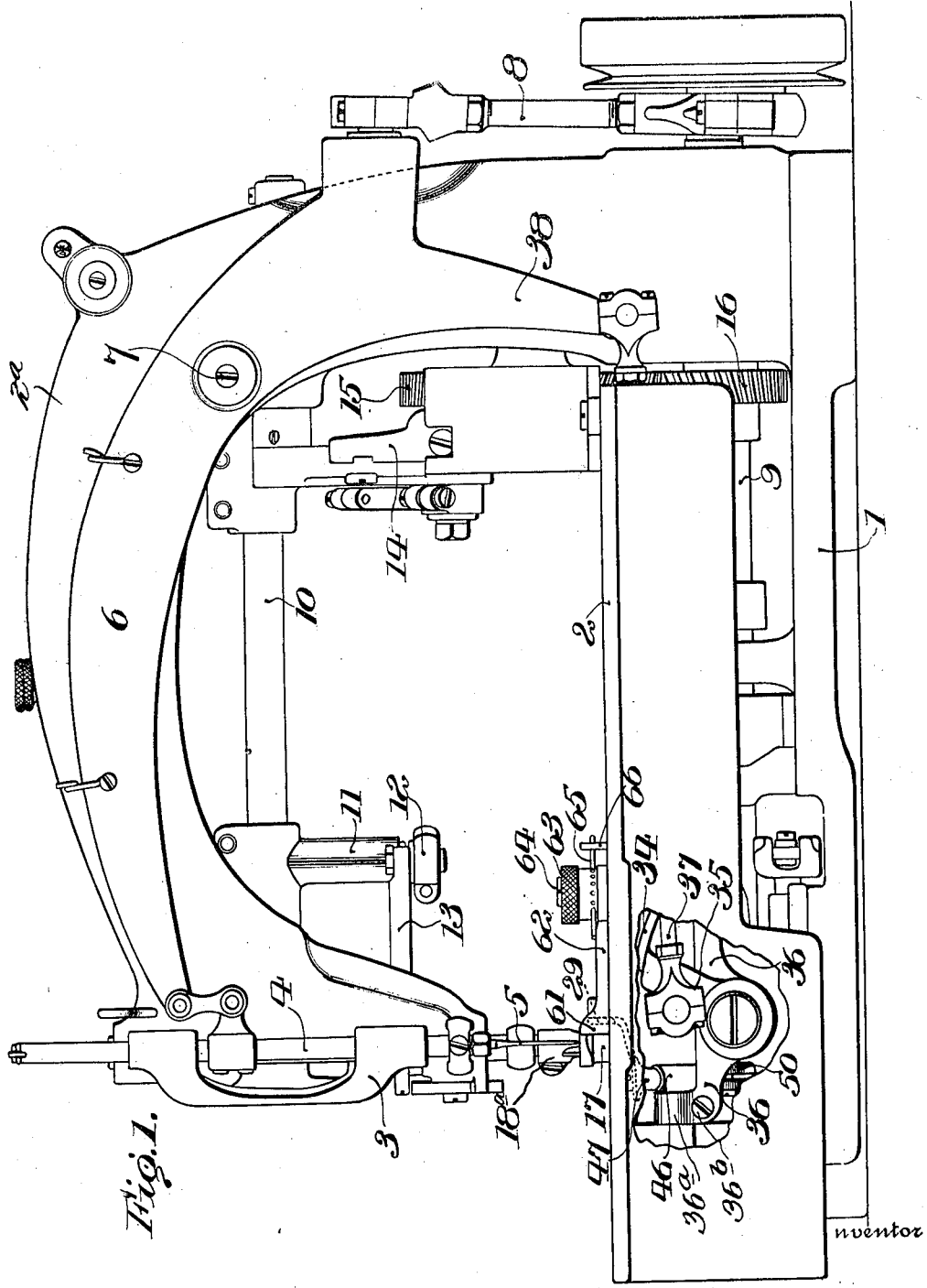

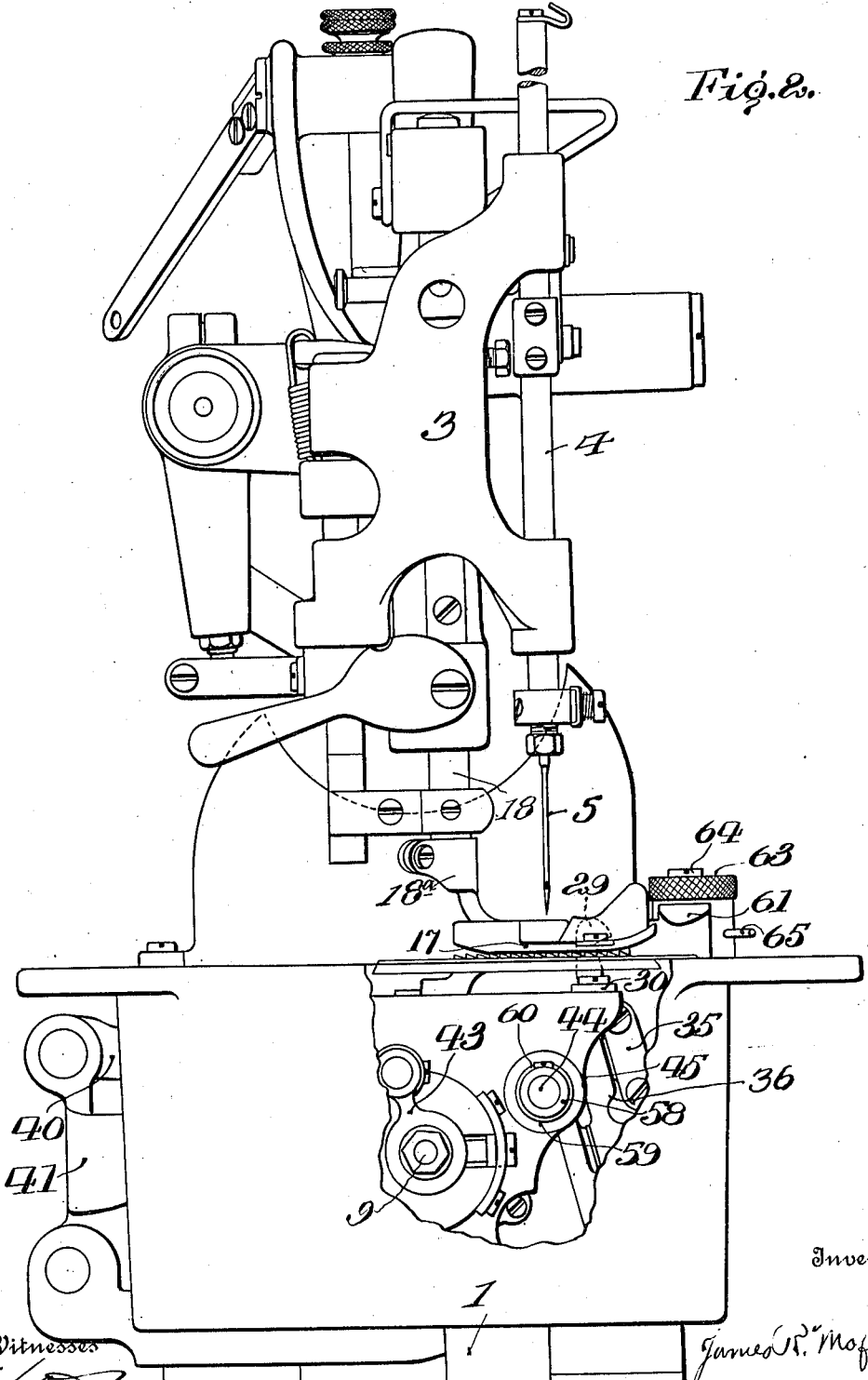

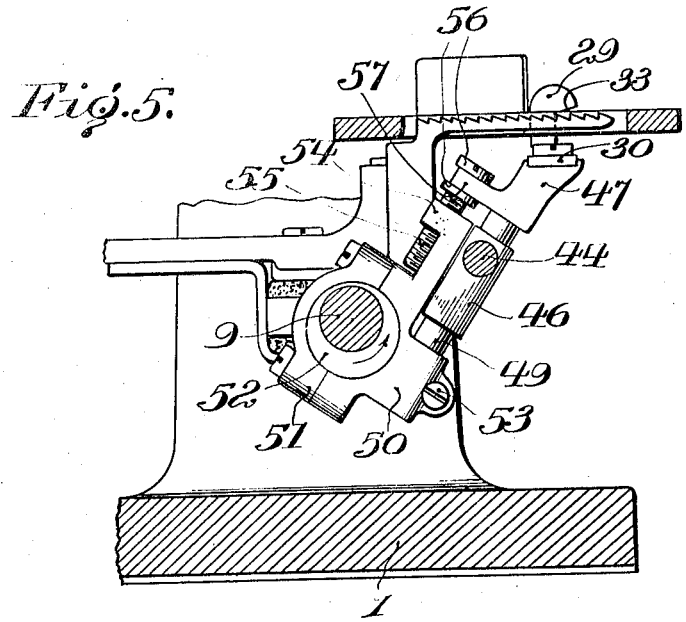
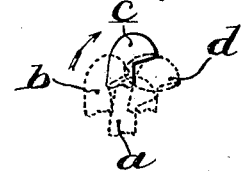
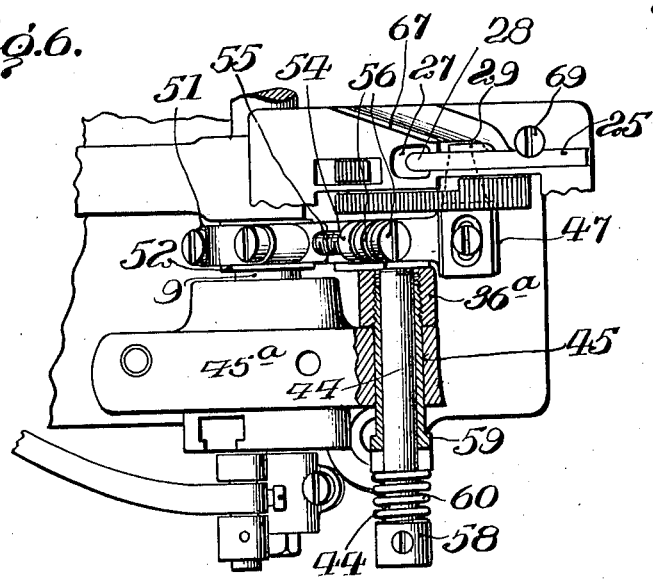

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

TRIMMING MECHANISM FOR SEWING-MACHINES.

1,292,008.  Specification of Letters Patent.  Patented Jan. 21, 1919.

Application filed March 26, 1914. Serial No. 827,287.

*To all whom it may concern:*

Be it known that I, JAMES R. MOFFATT, a citizen of the United States, residing at Chicago, in the county of Cook, State of Illinois, have invented certain new and useful Improvements in Trimming Mechanism for Sewing-Machines, of which the following is a description, reference being had to the accompanying drawing and to the figures of reference marked thereon.

The invention relates to new and useful improvements in trimming mechanisms for sewing machines, and more particularly to a trimming mechanism wherein the movable trimming blade overhangs the material being severed.

An object of the invention is to provide a trimming mechanism of the above character with devices for actuating the movable trimmer blade, which devices are so arranged as to move the cutting blade positively.

A further object of the invention is to provide actuating devices for the movable cutter which gives to the cutter blade a backward as well as a downward cutting movement, so as to perform a drawing cut on the material, whereby relatively thick materials may be severed.

A further object of the invention is to provide a trimmer operating mechanism, which is so constructed that the trimming blade is moved rearwardly after its cutting action to facilitate the feed of the material and the arrangement of the cutter blade which projects above and overhangs the material for its next cutting stroke.

A still further object of this invention is to provide a trimming mechanism wherein the stationary trimming blade is formed as a part of the tongue over which the stitches are laid, so that the trimming mechanism may be located at a point close to the stitching mechanism.

These and other objects will in part be obvious and will in part be more fully described.

In the drawings which show by way of illustration one embodiment of the invention:

Figure 1 is a front view of a sewing machine embodying my improvements, certain parts being broken away to show the operating mechanism.

Fig. 2 is an end view of the same, also having the parts of the cloth plate broken away to expose the operating mechanism.

Fig. 3 is a detail in perspective, showing the work support, the needle, the presser foot and the parts adjacent the same.

Fig. 4 is a transverse sectional view through the work support substantially on the trimming line.

Fig. 5 is a detail, partly in section, showing the trimmer operating mechanism and the feed dog.

Fig. 6 is a detail in plan, showing the trimmer operating mechanism and certain of the parts adjacent thereto.

Fig. 7 is a detail in perspective showing the presser foot, throat plate and the movable trimming blade, these parts being separated in order to show their relation to each other and the trimming blade is also shown in dotted lines in operative position relative to the throat plate.

Fig. 8 is a transverse sectional view through the throat plate, showing the movable trimmer blade and its position relative to the throat plate and stationary trimming blade.

Fig. 9 is a detail in plan, showing the throat plate, the stationary trimming member and the movable trimming member.

Fig. 10 is a view, showing a portion of the movable trimming blade and in dotted lines the path of movement of said movable blade.

This invention consists generally of providing a trimming mechanism which includes a stationary ledger blade and a movable trimming blade. The stationary blade is located in a recess in the throat plate and its upper surface is substantially flush with the work supporting surface of the throat plate. This blade is formed of hardened steel and is so shaped and constructed as to extend rearwardly of the cutting point and forms the stitch finger or tongue over which the threads are laid when a zigzag or cross-stitching mechanism is used. The movable trimming blade is of the type wherein the blade is carried by a support beneath the cloth plate and the shank of the blade projects through the cloth plate. The blade carried by this shank overhangs the cloth plate and is moved downward into contact with the ledger blade as it performs its cutting function. The mechanism for actuating this movable blade is positively connected thereto and is so disposed that the blade is pulled downwardly for its cutting action by a direct downward pull from the actuating mechanism for the blade and this actuating mechanism is also so constructed that the blade moves rearwardly during its cutting stroke, so as to perform a drawing cut and this also positions the shank of the blade so as to permit the free feed of the material being severed.

Referring more in detail to the drawings, the sewing machine embodying my invention consists of a supporting bed 1, carrying a work support or cloth plate 2. The overhanging arm 2ª is mounted on the supporting bed 1 and carries a needle gate 3 at its forward end, in which a needle bar 4 reciprocates. This needle bar carries a needle 5, and the needle bar is oscillated by a needle lever 6, pivoted at 7 to the overhanging arm and connected by a link 8 to an eccentric on the main shaft 9. The needle gate is oscillated in order to vibrate the needle by a rock shaft 10 which carries a depending arm 11 connected by a link 12 to an arm 13 formed integral with the needle gate. The rock shaft 10 is oscillated by a forked arm 14 which coöperates with an eccentric carried by a gear 15, mounted on a stub shaft attached to the overhanging arm. The gear 15 in turn meshes with a gear 16 on the main shaft 9. These gears are so proportioned that the rock shaft 10 oscillates in one direction for one complete reciprocation of the needle bar and in the other direction for a second complete reciprocation of said needle bar.

A presser foot 17 is mounted on a presser bar 18 which in turn is mounted in the overhanging arm. This presser foot 17 consists of a shank 18ª attached to the presser bar and the foot proper 19 is pivoted to the shank 18ª. The presser foot has a needle slot 20 which is elongated transversely of the foot, so as to permit the needle to be vibrated laterally. The presser foot, also, has a laterally adjustable guide 21, which extends to a point adjacent a slot in the foot.

The material being stitched is held on the cloth plate by the presser foot 17. Directly beneath the presser foot is a throat plate 22, which is formed with the usual feed slots 23. The throat plate is also provided with a recess 24, in which is mounted the stationary ledger blade 25 of the trimming mechanism. This stationary blade is formed of hardened steel and extends along one side of the trimming slot 26 in the throat plate. Said blade also extends into the needle throat at 27, so that the forward end of the blade 28 provides a stitch finger. In other words, the needle passes down first on one side of the extension 28 of the trimming blade and then on the other side thereof, so that the needle threads are laid across this end portion of the trimming blade which forms the stitch finger. The blade terminates in the needle throat so that the feed of the material will carry these threads off from the stitch finger in the well known manner.

Coöperating with the fixed trimming blade 25 is a movable blade 29. This movable blade consists of a shank 30, which shank is turned up, as at 31, so as to project through the trimming slot 26 in the throat plate. The shank is secured to the trimmer operating support beneath this throat plate. Said trimmer 29 has a blade 32 which is formed integral with a shank 31' and this blade 32 has an overhanging cutting portion 33.

Coöperating with the needle 5 beneath the work support is a looper 34. This looper is carried by a looper carrier 35, which in turn is pivoted on a looper rocker frame or support 36. The looper carrier is oscillated by a link 37 which is connected with a needle lever extension 38. This looper operating mechanism is of the usual character and further description thereof is not thought necessary.

The material is fed to the stitching mechanism by a feed dog 39, which is carried by a feed bar 40, pivoted to a feed rocker 41. The feed bar is raised and lowered by an eccentric 42 on the main shaft 9, while the rocker 41 is oscillated back and forth by a link 43 attached to a crank on the end of the main shaft 9, see Fig. 2. This feed mechanism is also of the usual construction and further description thereof will not be necessary.

A sleeve 45 is loosely mounted in the bracket 45ª carried by the bed plate and the inner end of the sleeve is threaded. The looper rocker frame or support 36 carries at one end a split collar 36ª which has threaded engagement with the inner end of the sleeve 45. This collar is clamped to said sleeve by a screw 36ᵇ. The looper rocker frame 36 is therefore fixed to the sleeve 45 and the sleeve oscillates with the frame 36.

Loosely mounted in the sleeve 45 is a short shaft 44. The inner end of this shaft projects beyond the collar 36ª and carries a sleeve 46, said sleeve being disposed at right angles to the longitudinal axis of said shaft 44. Slidably mounted in the sleeve 46 is a post 49 which carries a movable knife support 47. The post 49 may be of any desired cross section.

The movable cutting blade 29 is adjustably fixed to the knife support 47. The shank 30 of the trimming blade has a slot 48 through which a screw passes for clamping the trimming blade to said support. This slot is elongated so that the blade may be adjusted. The post 49 of the movable knife support 47 extends into a collar 50 formed as a part of the eccentric strap 51 which coöperates with an eccentric 52 on the main shaft 9. The screw 53 clamps this cylindrical part in the collar 50. The eccentric strap is also formed with an extension 54. A screw 55 is threaded into a lug on the extension 54 and this screw carries at its upper end spaced collars 56 which engage a forked extension 57 on the movable knife support 47.

As the eccentric strap is oscillated by the eccentric, the movable knife support will be moved up and down in the sleeve 46 and this sleeve becomes a guiding means for the eccentric strap.

Integral with the outer end of the sleeve 45 is a collar 59, and the outer end of the shaft 44 projects some distance beyond this collar. Fixed to the outer end of the shaft 44 by a set screw is a collar 58, and disposed around the shaft 44 between the collars 58 and 59 is a spring 60. This spring being on one side of the stationary trimming blade and the movable trimming blade being on the other side of said stationary blade, causes the movable blade to be compressed or drawn yieldingly against the stationary blade.

When it is desired to change the tension or pressure between the movable blade and the stationary blade, or when the parts are being initially assembled, the screw 36$^b$ may be turned to disengage the collar 36$^a$ from the sleeve 45 and the parts then properly adjusted by turning the sleeve 45 to obtain the proper compression of the spring 60. The screw 36$^b$ is then turned to lock the collar 36$^a$ on the sleeve.

Starting with the parts positioned, as shown in Fig. 5, the eccentric 52 is turning in the direction of the arrow, and this eccentric will first raise the posts 49 in the sleeve 46 and will move the lower end of the support below the pivotal point 44 away from the main shaft 9, but in turn will raise the trimming blade 29, swinging the same rearward in the direction of the line of feed. When the eccentric 52 is turned through an arc of 90°, the trimmer blade is then at its extreme rearward position and is still being raised relative to the cloth plate. The position of the trimming blade with the parts as in Fig. 5 is indicated in dotted lines at $a$, Fig. 10. When the eccentric is turned to 90° the trimming blade is moved to the position indicated at $b$ in this figure. A movement of the eccentric through the second arc of 90° will raise the trimming blade 29 to its extreme upper position, which is the position indicated at $c$ in Fig. 10. The movement of the eccentric 52 through another arc of 90° will cause the trimmer blade 29 to move downward and to move forward, which positions the trimmer blade for its cutting action. This position is indicated at $d$ in Fig. 10. The movement of the eccentric 52 through the last arc of 90° to the position indicated in Fig. 5, is the cutting stroke and this stroke is downward and slightly rearward, which makes a drawing cut and facilitates the severing of the material. It is to be noted that the eccentric 52 is almost directly beneath the cutting blade 29. By this arrangement heavy material may be readily severed without any springing of the parts. When it is desired to adjust the head of the trimming blade 29, so as to bring it into proper coöperating relation with the fixed blade, the screw 53 is loosened and by turning the screw 57, the support 47 may be raised or lowered relative to the eccentric strap and this will raise or lower the trimming blade. The screw 53 is then set up, so as to assist in holding the parts in their adjusted position, although the screw 57 by which the adjustment is made also holds these parts in their adjusted position.

The timing of the eccentric 52, relative to the crank on the end of the shaft, which moves the feed dog back and forth, is such that when the trimmer blade is raised and moved forward for its trimming action the feed dog is moving in a rearward direction so as to carry the fabric a stitch length.

The fabric may be guided underneath the presser foot by an edge guide 61, which has a shank 62 engaging an eccentric 63 carried by a supporting stud 64. A pin 65 may be used for rotating this eccentric so as to adjust the edge guide toward and from the line of feed. A stop pin 66 may provide for limiting the movement of the eccentric. This guide forms no part of the present invention and further description thereof is not thought necessary.

In order that the trimmed off strip may be deflected away from the stitching mechanism, I have provided a deflector 67, which is seated in a groove and rigidly attached to the throat plate 22. The throat plate is also cut away as at 68, so that the trimmed off strip will be carried against the deflector and thus deflected away from the stitching mechanism which is in the rear of the front end of the deflector.

Sometimes the severed edge will not be deflected from the stitching mechanism by the deflector 67 but will curl over in a direction toward the stitching mechanism. In order to prevent this, the guide or deflector 21 is mounted on the presser foot for lateral adjustment. This deflector is provided adjacent the needle with a lateral extension 21$^a$ which overhangs the blade 29. The deflector 21 is adjusted so that this extension will abut the front edge of the deflector 67. This deflector 21 with the extension coöperates with the deflector 67 to insure the positive deflection from the trimmed off strip away from the stitching mechanism. The right hand side of the presser foot is cut away so as to allow the deflector 67 to be placed with its front end as close as possible to the trimming mechanism.

By the above construction of trimming mechanism, the trimmer may be set very close to the stitching mechanism and an edge trimmed and the said trimmed edge covered by the stitching threads. The cutting face of the trimming blade 29 lies in a plane passing between the extremes of throw of the needle so that the cut edge will be covered by the stitching threads. The stationary cutter 25 is held in the recess 24 by a screw 69. The throat plate is also provided with openings 70 through which access may be had to the screw for securing the shank of the trimmer to the support 47 and also to the screw 55 for adjusting the trimmer.

It is obvious that minor changes in the detail of construction and the arrangement of parts may be made without departing from the spirit of the invention as set forth in the appended claims.

Having thus described my invention, what I claim as new and desire to secure by Letters Patent, is:

1. A trimming mechanism including in combination, a work support, a movable trimming member mounted beneath the work support and overhanging the same, a support on which said movable trimming member is mounted, an eccentric member connected to the lower end of said support for actuating the same, and a bearing sleeve in which said supporting member is mounted to reciprocate said bearing sleeve being located between the eccentric and the trimming member and mounted to oscillate.

2. A trimming mechanism including in combination, a work support, a movable trimming member mounted beneath the work support and overhanging the same, a support on which said movable trimming member is mounted, an eccentric member connected to the lower end of said support for actuating the same, a bearing sleeve in which said supporting member is mounted to reciprocate, said bearing sleeve being located between the eccentric and the trimming member and mounted to oscillate, and means whereby said movable trimming member may be adjusted on its support relative to its reciprocating means for varying the position of the trimming member.

3. A trimming mechanism including in combination, a work support, a movable trimming member mounted beneath the work support and overhanging the same, a support to which said movable trimming member is attached, a sleeve in which said support reciprocates, and an eccentric member for engaging the lower end of said support below said sleeve for reciprocating the same.

4. A trimming mechanism including in combination, a work support, a stationary trimming member mounted on the work support and having its upper face substantially flush therewith, a movable trimming member mounted beneath the work support and overhanging the same and coöperating with said stationary member, a support to the upper end of which said movable trimming member is attached, a main shaft beneath the work support, an eccentric on said main shaft, means for connecting said eccentric to said support for the trimming member, and a supporting bearing on which the support for the upper movable trimming member reciprocates, said supporting bearing being disposed between the trimming member and said eccentric member and mounted for oscillation.

5. A trimming mechanism, including in combination a work support, a movable trimming member, a stationary trimming member coöperating with said movable trimming member, said movable trimming member having an overhanging cutting edge, a support for said movable trimming member beneath the work support, a main shaft beneath the work support, an eccentric thereon, a pivoted sleeve in which said support for the trimming member may slide, and means operated by said eccentric for reciprocating said support in said sleeve, and for oscillating the sleeve.

6. A trimming mechanism, including in combination a work support, a movable trimming member, a stationary trimming member coöperating with said movable trimming member, said movable trimming member having an overhanging cutting edge, a support for said movable trimming member beneath the work support, a main shaft beneath the work support, an eccentric thereon, a pivoted sleeve in which said support for the trimming member may slide, means operated by said eccentric for reciprocating said support in said sleeve and for oscillating the sleeve, and devices whereby said support for the trimming member may be adjusted relative to its actuating means.

7. A trimming mechanism, including in combination a work support, a main shaft beneath the work support, an eccentric on said shaft, a stationary trimming member carried by the work support, a movable trimming member having an overhanging cutting edge, a support for said movable trimming member, an eccentric strap coöperating with said eccentric, said trimming member support being fixed to said eccentric strap, means for guiding the movements of said eccentric strap, said means for guiding the eccentric strap including a pivoted sleeve, whereby the support for the trimming member is rocked during its bodily movement and the trimming member given a drawing cutting action.

8. A trimming mechanism, including in combination a work support, a main shaft beneath the work support, an eccentric on said shaft, a stationary trimming member carried by the work support, a movable trimming member having an overhanging cutting edge, a support for said movable trimming member, an eccentric strap coöperating with said eccentric, said trimming member support being fixed to said eccentric strap, means for guiding the movements of said eccentric strap, said means for guiding the eccentric strap including a pivoted sleeve, whereby the support for the trimming member is rocked during its bodily movement and the trimming member given a drawing cutting action, and means for adjusting the position of the support for the trimming member relative to the eccentric strap.

9. A trimming mechanism, including in combination a work support, a stationary trimming member carried by said work support and having its upper face substantially flush with the surface of the work support, a movable trimming member having a cutting edge overhanging said work support, a support for said movable trimming member on which said member is adjustably mounted, a sleeve in which said support for the trimming member reciprocates, means for supporting said sleeve whereby the same may oscillate, means for yieldingly pressing said movable trimming member against the stationary trimming member, and means for reciprocating said support in said sleeve.

10. A trimming mechanism, including in combination a work support, a stationary trimming member carried by said work support, a movable trimming member having an overhanging cutting edge coöperating with said stationary trimming member, a support for said movable trimming member, a sleeve in which said support for the movable trimming member reciprocates, means for pivotally supporting said sleeve, devices for yieldingly pressing the movable trimming member into contact with the stationary trimming member, an eccentric strap attached to said support for the movable trimming member for reciprocating said support in said sleeve and for oscillating the sleeve, a main shaft beneath the work support, and an eccentric carried by said shaft for operating said eccentric strap.

11. A trimming mechanism, including in combination a work support, a stationary trimming member carried by said work support, a movable trimming member having an overhanging cutting edge coöperating with said stationary trimming member, a support for said movable trimming member, a sleeve in which said support for the movable trimming member reciprocates, means for pivotally supporting said sleeve, devices for yieldingly pressing the movable trimming member into contact with the stationary trimming member, an eccentric strap attached to said support for the movable trimming member for reciprocating said support in said sleeve and for oscillating the sleeve, a main shaft beneath the work support, an eccentric carried by said shaft for operating said eccentric strap, and means for adjusting said support for the trimming member relative to the eccentric strap and for holding said support in its adjusted positions.

12. A sewing machine, including in combination a stitch forming mechanism, a trimming mechanism including a movable trimming blade located in advance of the stitching mechanism, and a stationary trimming blade coöperating with said movable blade, said stationary trimming blade being extended so as to form a stitch finger around which the stitching threads may be laid.

13. A sewing machine, including in combination a work support, stitch forming mechanism and a trimming mechanism including a movable trimming member having an overhanging cutting edge located in front of the stitch forming mechanism, a stationary trimming blade having its upper face substantially flush with the upper surface of the work support, said stationary trimming blade being extended so as to form a stitch finger around which the stitching threads may be laid.

14. A sewing machine, including in combination a work support, stitch forming mechanism including a lateral vibrating needle, a trimming mechanism including a movable trimming member located in advance of the needle, and a stationary trimming member, said stationary trimming member being extended so as to cross the plane of reciprocation of the needle and form a stitch finger around which the stitching threads are laid.

15. A sewing machine, including in combination a work support having a throat plate with a needle opening therein, and a stationary trimming member carried by said throat plate and having its upper face substantially flush therewith, said stationary trimming member being extended into the needle opening and forming a stitch finger around which the stitches may be laid, said throat plate having a deflector rigidly attached thereto and extending to a point in front of the needle opening for deflecting the trimmed off strip away from the stitching mechanism.

16. A sewing machine, including in combination a work support, stitch forming mechanism including a needle, a looper coöperating with the needle, a looper support on which said looper is oscillated, a sleeve attached to said looper support and supporting one end thereof, a shaft extending through said sleeve and having a sleeve on the end thereof extending in a direction at right angles to the axes of the shaft, a support having a portion thereof mounted in said sleeve carried by the shaft, an eccentric strap, attached to said support for reciprocating the same in said sleeve and for oscillating said sleeve, a trimmer carried by said support, an eccentric for operating said eccentric strap, a stationary trimming member coöperating with the movable trimming member, and a spring coöperating with said shaft for moving the sleeve carried thereby to hold the movable trimming member yieldingly in contact with the stationary trimming member.

17. A throat plate for sewing machines having a needle throat, a trimmer slot, a recess for a stationary trimming member, a trimming blade mounted in said recess and extending along the side of said trimming slot and into the needle throat for forming a stitch finger, and means for holding the trimming member in said recess.

18. A throat plate for sewing machines having a needle throat, a trimmer slot, a recess for a stationary trimming member, a trimming blade mounted in said recess and extending along the side of said trimming slot and into the needle throat for forming a stitch finger, means for holding the trimming member in said recess, and a deflector rigidly attached to said throat plate and having its front end terminating adjacent said trimmer slot, said throat plate having a recess therein in front of said deflector.

19. A sewing machine including in combination a work support, a stationary trimming member carried by the work support, a movable trimming member coöperating with said stationary trimming member, a deflector rigidly attached to the work support and extending to a point in front of the needle opening for deflecting the trimmed off strip away from the stitching mechanism, a presser foot, and a guide adjustably carried by said presser foot and having a lateral extension located in front of the needle opening, which lateral extension coöperates with the deflector on the work support.

20. A sewing machine, including in combination stitching mechanism and trimming mechanism, said trimming mechanism including a trimming member extended to form a stitch finger around which the stitching threads may be laid.

In testimony whereof, I affix my signature in the presence of two witnesses.,

JAMES R. MOFFATT.

Witnesses:
J. C. RATNER,
A. F. BUDSHALL.